United States Patent
Kotula et al.

(10) Patent No.: US 11,370,483 B2
(45) Date of Patent: Jun. 28, 2022

(54) STEER BY WIRE SYSTEM WITH DYNAMIC BRAKING AND ENDSTOP CUSHIONING FOR HAPTIC FEEL

(71) Applicant: Sensata Technologies, Inc., Attleboro, MA (US)

(72) Inventors: Max L. Kotula, Eden Prairie, MN (US); Maxwell C. Geary, Bloomington, MN (US); Brent R. Chinnock, Chaska, MN (US); Andrew F. Willner, Attleboro, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 212 days.

(21) Appl. No.: 16/773,183

(22) Filed: Jan. 27, 2020

(65) Prior Publication Data

US 2021/0229738 A1    Jul. 29, 2021

(51) Int. Cl.
*B62D 6/00* (2006.01)
*B62D 5/00* (2006.01)
(Continued)

(52) U.S. Cl.
CPC ............. *B62D 6/008* (2013.01); *B60W 50/16* (2013.01); *B62D 5/006* (2013.01); *B62D 5/0469* (2013.01)

(58) Field of Classification Search
CPC ...... B62D 6/008; B62D 5/006; B62D 5/0469; B60W 50/16
See application file for complete search history.

(56) References Cited

U.S. PATENT DOCUMENTS

| 4,497,503 A | 2/1985 | Irwin |
| 4,903,936 A | 2/1990 | Kajiwara |
| (Continued) | | |

FOREIGN PATENT DOCUMENTS

| CN | 201677915 | 12/2010 |
| CN | 104085442 | 10/2014 |
| (Continued) | | |

OTHER PUBLICATIONS

Susan G. Hill, et al.; Army Research Laboratory; "The Use of a Steering Shaping Function to Improve Human Performance in By-Wire Vehicles"; Publication No. ARL-TR-4387; Mar. 2008, 34 pages.

*Primary Examiner* — Mary Cheung
(74) *Attorney, Agent, or Firm* — Lee & Hayes, P.C.

(57) ABSTRACT

A haptic feedback mechanism for steering by wire system includes a motor. Electronic circuitry includes a node and switches for controlling the motor. A voltage sensor at the node and a motion sensor for the DC motor feed a motor control logic module that is operative to: determine if the voltage at the node is above a predetermined threshold; determine if the input motion is above a predetermined speed; and change the switches into an overcurrent protection mode if the voltage is above the predetermined threshold or the input motion is above the predetermined speed. In overcurrent protection mode, electrical power, generated by the input motion, passes through resistance and/or the motor to dissipate while maintaining haptic feedback. An endstop mechanism includes a position sensor coupled to the haptic feedback mechanism for detecting an angular position of the motor to increase feedback torque near an endstop of the motor.

17 Claims, 5 Drawing Sheets

(51) Int. Cl.
    *B62D 5/04*     (2006.01)
    *B60W 50/16*     (2020.01)

(56) References Cited

U.S. PATENT DOCUMENTS

| | | | |
|---|---|---|---|
| 5,884,724 | A | 3/1999 | Bohner et al. |
| 6,097,286 | A | 8/2000 | Discenzo |
| 6,219,604 | B1 | 4/2001 | Dilger et al. |
| 6,481,526 | B1 | 11/2002 | Millsap et al. |
| 6,578,444 | B1 | 6/2003 | Wendelin |
| 6,598,695 | B1 | 7/2003 | Menjak et al. |
| 6,625,530 | B1 | 9/2003 | Bolourchi |
| 6,688,645 | B2 | 2/2004 | Andonian et al. |
| 6,728,615 | B1 | 4/2004 | Yao et al. |
| 6,820,713 | B2 | 11/2004 | Menjak et al. |
| 6,896,089 | B2 | 5/2005 | Mills et al. |
| 6,899,196 | B2 | 5/2005 | Husain et al. |
| 6,926,112 | B2 | 8/2005 | Husain et al. |
| 7,174,987 | B2 | 2/2007 | Husain |
| 7,232,006 | B2 | 6/2007 | Dominke et al. |
| 7,325,644 | B2 | 2/2008 | Sakai |
| 7,946,195 | B2 | 5/2011 | Ito et al. |
| 8,752,664 | B2 | 6/2014 | Rombold |
| 9,475,519 | B2 | 10/2016 | Nagl et al. |
| 9,662,755 | B2 | 5/2017 | Yamanaka |
| 9,919,732 | B2 | 3/2018 | Levesque et al. |
| 2004/0064229 | A1 | 4/2004 | Stout et al. |
| 2006/0082362 | A1 | 4/2006 | Hino et al. |
| 2010/0332059 | A1 | 12/2010 | Lee et al. |
| 2013/0087121 | A1 | 4/2013 | Hiei et al. |
| 2017/0320515 | A1 | 11/2017 | Levesque et al. |
| 2018/0154924 | A1* | 6/2018 | Albrecht .............. B62D 15/025 |
| 2018/0215456 | A1 | 8/2018 | Ozaki |
| 2020/0307544 | A1* | 10/2020 | Lee ................. B60W 30/18109 |

FOREIGN PATENT DOCUMENTS

| | | | |
|---|---|---|---|
| CN | 203876812 | 10/2014 | |
| CN | 204020971 | 12/2014 | |
| DE | 19834868 | 2/2000 | |
| DE | 10046167 | 5/2001 | |
| DE | 10305132 | 11/2004 | |
| DE | 102013014133 | 10/2014 | |
| DE | 102013014137 | 10/2014 | |
| DE | 102013014138 | 12/2014 | |
| EP | 2840012 | 12/2016 | |
| JP | 2004330840 | 11/2004 | |
| JP | 2006282133 | 10/2006 | |
| JP | 2010173592 | 8/2010 | |
| JP | 2012006487 | 1/2012 | |
| JP | 2012091677 | 5/2012 | |
| KR | 20090007992 | 1/2009 | |
| WO | 2009/110665 | 9/2009 | |
| WO | 2010/064825 | 6/2010 | |
| WO | 2017/182502 | 10/2017 | |
| WO | WO-2019007986 A1 * | 1/2019 | ............. B62D 5/005 |

\* cited by examiner

STEER BY WIRE SYSTEM WITH DYNAMIC BRAKING AND ENDSTOP CUSHIONING FOR HAPTIC FEEL

BACKGROUND

1. Field of the Technology

The subject disclosure relates to steer by wire systems, and more particularly to steer by wire systems with dynamic braking and an endstop cushion for enhanced response and performance.

2. Background of the Related Art

Traditional vehicles are steered by a direct mechanical and/or hydraulic linkage between a steering wheel or joystick, steering gears, and the actual wheels. With such systems, the driver turns the steering wheel or joystick and, in turn, the steering gears turn the wheels. The feel of the system is created by the mechanical linkage, which may be power assisted. Change in the feel of the system may be an indication of one or more components not functioning properly or being in improper condition such as unbalanced or misaligned wheels.

To provide various advantages, direct mechanical linkages can be replaced with a steer by wire system. In a steer by wire system, a position encoder monitors the position of the steering wheel. The position encoder reading is translated into a desired position signal of the steering angle. An electric signal is sent to a steering control unit to properly turn the wheels in response to the desired position signal.

Steer by wire systems have great potential in that a number of required mechanical connections and components are eliminated. However, with these systems, rapid movement of the steering wheel by the user can interfere with the desired smooth haptic feel.

When steer by wire systems are utilized, there is typically a limitation of the range of travel for the control input (i.e., an endstop). When the travel limitation mechanism is physical, an undesirable experience such as a loud collision noise and/or spring back may occur if the user moves the control input to strike the physical limitation. Padding is often used to soften hitting the end of travel and reduce the noise. However, the padding may exacerbate the spring back from the end of travel and/or decrease the travel range below a desirable or acceptable limit. Virtual end stops include a magnetic brake or motor that applies force when the virtual endstop is reached to simulate the effect of having a physical limitation. Virtual endstops do not have the crashing noise problem but suffer from poor haptic feel, which is undesirable.

SUMMARY

In view of the above, a need exists for a steer by wire system that provides smooth operation even during rapid movement of the controller (e.g., steering wheel, joystick and the like) as well as at the end of travel.

Preferably, the steer by wire system has dynamic braking in a brushless DC motor that provides the haptic feedback torque to the controller. In another embodiment, a steer by wire system creates safe thermal conditions for the brushless DC motor and electronics while dissipating the energy added by the user's movement of the controller. Preferably, the steer by wire systems can accommodate rapid movement of the controller up to or even above 200 rpm.

In still another embodiment, the steer by wire system has an endstop mechanism that allows the full range of travel as well as prevents collision noises and spring back.

In one embodiment, the subject technology is directed to a haptic feedback mechanism for a steer by wire system in a vehicle having a hand-operable controller for guiding movement of the vehicle based on an input motion from a user. The haptic feedback mechanism includes a DC motor connected to the hand-operable controller for providing a haptic feedback to the user based on the input motion. The DC motor has motor coils. Electronic circuitry including a node and at least one pair of switches is coupled to the DC motor for controlling operation of the DC motor. A voltage sensor is coupled to the node for generating a voltage signal indicative of a voltage at the node. A current sensor is coupled to the DC motor for generating a voltage signal indicative of the current present in the DC motor (i.e., a DC motor current measurement). A motion sensor is coupled to the DC motor for generating a speed signal indicative of the input motion. A motor control logic module couples to: the at least one pair of switches for controlling operation of the DC motor; the voltage sensor for receiving the voltage signal; the current sensor for receiving the DC motor current measurement; and the motion sensor for receiving the speed signal. The motor control logic module is operative to: determine if the current in the DC motor current measurement exceeds a current requested by the motor control logic module; determine if the voltage at the node is above a predetermined threshold; determine if the input motion to the hand-operable controller is above a predetermined speed; and change the at least one pair of switches into an overcurrent prevention mode if the voltage is above the predetermined threshold or the input motion is above the predetermined speed. In the overcurrent prevention mode, a braking algorithm is applied to the DC motor for a predetermined time period in which electrical power, generated by the input motion, passes through resistance of at least one of the switches and the motor coils to dissipate while maintaining the haptic feedback for the user. An optional endstop mechanism includes a position sensor coupled to the haptic feedback mechanism for detecting an angular position of the motor or hand-operable controller, wherein the haptic feedback mechanism increases the feedback torque within a predetermined range of an end of travel of the DC motor or hand-operable controller.

The switch assembly may also include at least one braking resistor in series with a switch which is in parallel with the pair of switches for providing further resistance to dissipate the electrical power. The predetermined time period may be based on a maximum possible duration of a high speed input condition. Preferably, the electrical power is dissipated as heat and/or the predetermined time period is based on a time required to dissipate the heat. The at least two switches can be three pairs of switches in parallel, each pair having a high side switch and a low side switch so that in the overcurrent prevention mode, the high side switches are always open and the low side switches are closed periodically to balance the power dissipation and haptic feel desired. The sensor assembly may also include a DC power supply circuit, wherein three pairs of switches are configured in a half bridge between the DC motor and the DC power supply circuit.

Another embodiment of the subject technology is directed to an endstop mechanism for a steer by wire system for steering a vehicle having a hand-operable controller for guiding movement of the vehicle. The endstop mechanism includes a haptic feedback mechanism having a motor coupled to the hand-operable controller for providing feedback torque on the hand-operable controller. A position sensor couples to the haptic feedback mechanism for detecting an angular position of the motor or hand-operable controller, wherein the haptic feedback mechanism increases the feedback torque within a predetermined range of an end of travel of the motor or hand-operable controller.

The endstop mechanism may also include a speed sensor coupled to the haptic feedback mechanism for detecting a speed of the hand-operable controller, wherein the feedback torque is adjusted by modifying a damping coefficient proportional to the speed within the predetermined range and a proximity to the end of travel. Preferably, when a direction of travel changes to be away from the end of travel, the haptic feedback mechanism resets the velocity damping coefficient to one for returning to normal operation within the predetermined range. The hand-operable controller can be a steering wheel, joystick, combination of joysticks, and the like.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION OF PREFERRED EMBODIMENTS

Figure 1:
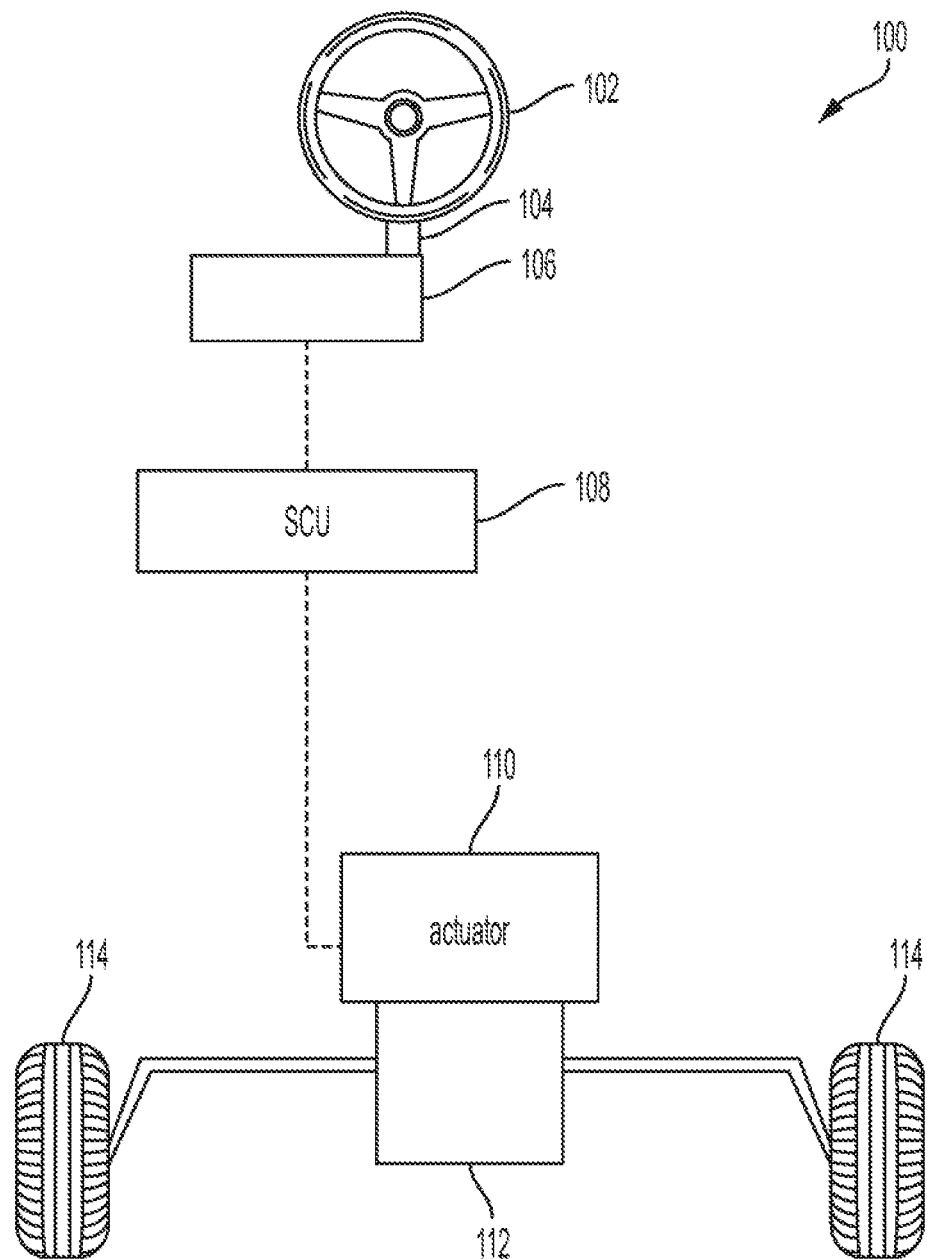
FIG. 1 is a schematic diagram of a steer by wire system in accordance with the subject disclosure.

The subject technology overcomes many of the prior art problems associated with steer by wire systems and methods. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Referring now to FIG. 1, there is shown a schematic diagram of a steer by wire system 100 in accordance with the subject disclosure. The steer by wire system 100 has an absence of mechanical or hydraulic connection between the user and the mechanism directing the wheels. The system 100 has a controller 102, such as a joystick or steering wheel, 102 for the user that is connected to a steering column 104. The column 104 is coupled to a haptic feedback mechanism 106. The haptic feedback mechanism 106 communicates with a steering control unit (SCU) 108. The haptic feedback mechanism 106 and the SCU 108 are shown as distinct but may be partly or wholly integrated into a single unit such as a SCU 108 that includes a submodule haptic feedback mechanism. The SCU 108 can translate column movement into an actuator control signal. The actuator control signal is sent to an actuator 110 that drives the desired movement of the steering mechanism 112 so that the wheels 114 turn in the desired manner.

Figure 2:
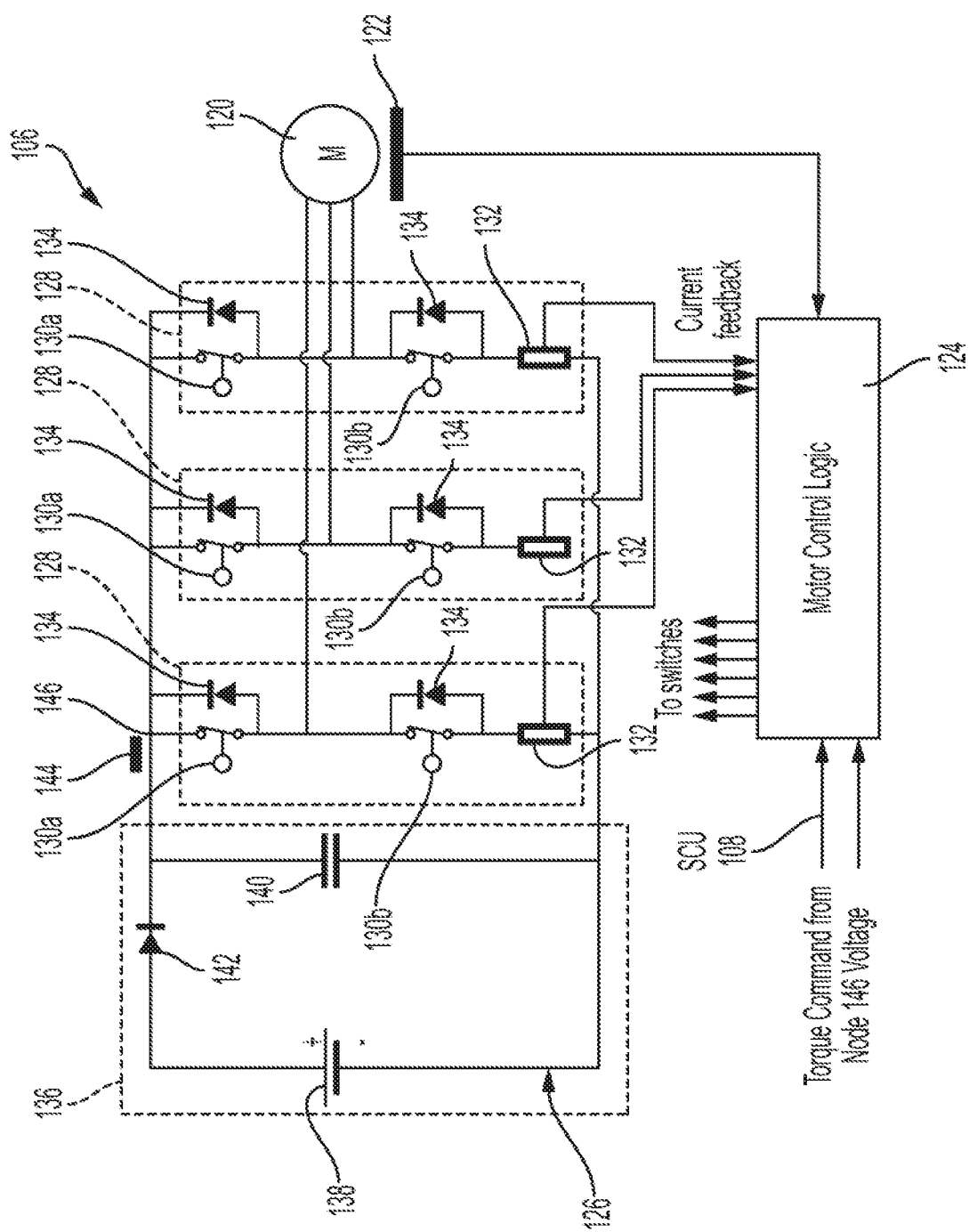
FIG. 2 is a schematic view of a DC motor and associated electronics for a steer by wire system in accordance with the subject disclosure.

Referring now to FIG. 2, a schematic view of a haptic feedback mechanism 106 for the steer by wire system 100 is shown. The haptic feedback mechanism 106 includes a DC motor 120 that couples to the steering column 104 for providing the haptic feedback torque to create a traditional operating experience for the user. Preferably, the DC motor 120 is a three-phase brushless DC motor 120. A sensor assembly 122 couples to the motor 120 for generating and sending a signal indicative of the shaft angle position measurement to a motor control logic module 124. In other words, the sensor assembly 122 determines the rotational speed of the steering column 104. The sensor assembly 122 may be one or more individual sensors that measure various parameters in accordance with the subject technology. The sensors may be coupled to the motor, the steering column, the steering wheel and like locations as needed to generate signals indicative of the information utilized in the subject technology. Similarly, in a joystick or other application, the sensors may be placed as needed in various locations. One embodiment of sensor assembly 122 includes a sensor configured to measure the current of the DC motor 120.

The motor control logic module 124 is also electrically connected to the electronics 126 for driving the DC motor 120. Preferably, the motor control logic module 124 uses a pulse width modulation (PWM) control signal with a predefined duty cycle for motor control. The driving electronics 126 as well as software may be partially or fully integrated into the SCU 108 or integrated into the haptic feedback mechanism 106 as shown. In any case, the haptic feedback mechanism 106 and/or the SCU 108 control the commutation of the DC motor 120 and all other aspects of control.

Preferably, the driving electronics 126 includes a three-phase half bridge driver configuration that includes three switch assemblies 128 controlled by the motor control logic module 124 of the haptic feedback mechanism 106. Each switch assembly 128 includes a pair of switches 130a, 130b in series with an optional current sense resistor 132. The current sense resistor 132 allows measuring current in each phase of the DC motor 120 for precise haptic control of the DC motor 120. Thus, the total current in the DC motor 120 is known. In one embodiment, the current sense resistor 132 converts phase currents to a voltage signal used by the motor control logic 124 to calculate the total current in the motor 120.

Switches 130a are high side switches. Switches 130b are low side switches. Each switch 130a, 130b is in parallel with a diode 134. Each switch 130a, 130b is preferably a MOSFET switch. The switch assemblies 128 are connected in parallel with a power supply circuit 136. The power supply circuit 136 includes a DC motor power supply 138, a capacitor 140 and a diode 142.

In addition to the shaft angle position measurement signal, the motor control logic module 124 also receives current feedback data from the driving electronics 126. A sensor 144 at a supply node 146 in the driving electronics 126 is a voltage sensor in communication with the motor control logic 124. Based on the signal from the sensor 144, the motor control logic can determine if an overvoltage condition is present at the DC motor power supply 138. As can be seen, a signal from sensor 144 indicating the voltage at the supply node 146 can effectively be used to determine the current in the DC motor 120. Still further, the motor control logic module 124 also receives data regarding the torque command from the SCU 108.

In operation, the switches 130a, 130b are turned on and off according to an algorithm to supply current to the phases of the motor 120 resulting in haptic torque of the steering wheel or joystick 102 for the user. In other words, by setting the current in the motor 120 by controlling the amount of voltage to the motor 120, the feedback torque on the motor 120 varies based on the sensed inputs and data received by the motor control logic module 124. However, when the user moves the steering wheel or joystick 102 quickly, a significant amount of mechanical power can be input to the haptic feedback mechanism 106. The input mechanical power is applied to the motor 120 so that the motor 120 acts as a generator to convert the input mechanical power to current. The generated current is undesirable because the current could trip protective measures that drop motor torque feedback to zero. Motor torque feedback dropping to zero is undesirable because the steering wheel or joystick 102 would lose the desired feel. For example, the user may think that a loss of control occurred without the haptic feel even though control may still be present which could lead to an unsafe driving condition.

To prevent dropping the motor torque feedback, the motor control logic module 124 monitors current in the motor 120 using the current sense resistors 132, the motor shaft rotation speed using the sensor assembly 122 and the voltage at the supply node 146 using the voltage sensor 144. Any or all of the resistors 132, sensor assembly 122, and voltage sensor 144 may be used to avoid dropping the motor torque feedback by shifting into an overcurrent protection mode. For example, the motor control logic module 124 can determine when an overcurrent condition is about to occur based on a current measurement from the current sense resistors 132 that exceeds the requested current by the motor control logic module 124 in combination with the rotation speed reading from the sensor assembly 122 and/or the voltage signal from the sensor 144. When an overvoltage condition is about to occur or has occurred the SCU 108 prevents dropping motor torque feedback by managing operation to maintain the desired smooth feel for the user (e.g., enter overcurrent protection mode).

Figure 3:
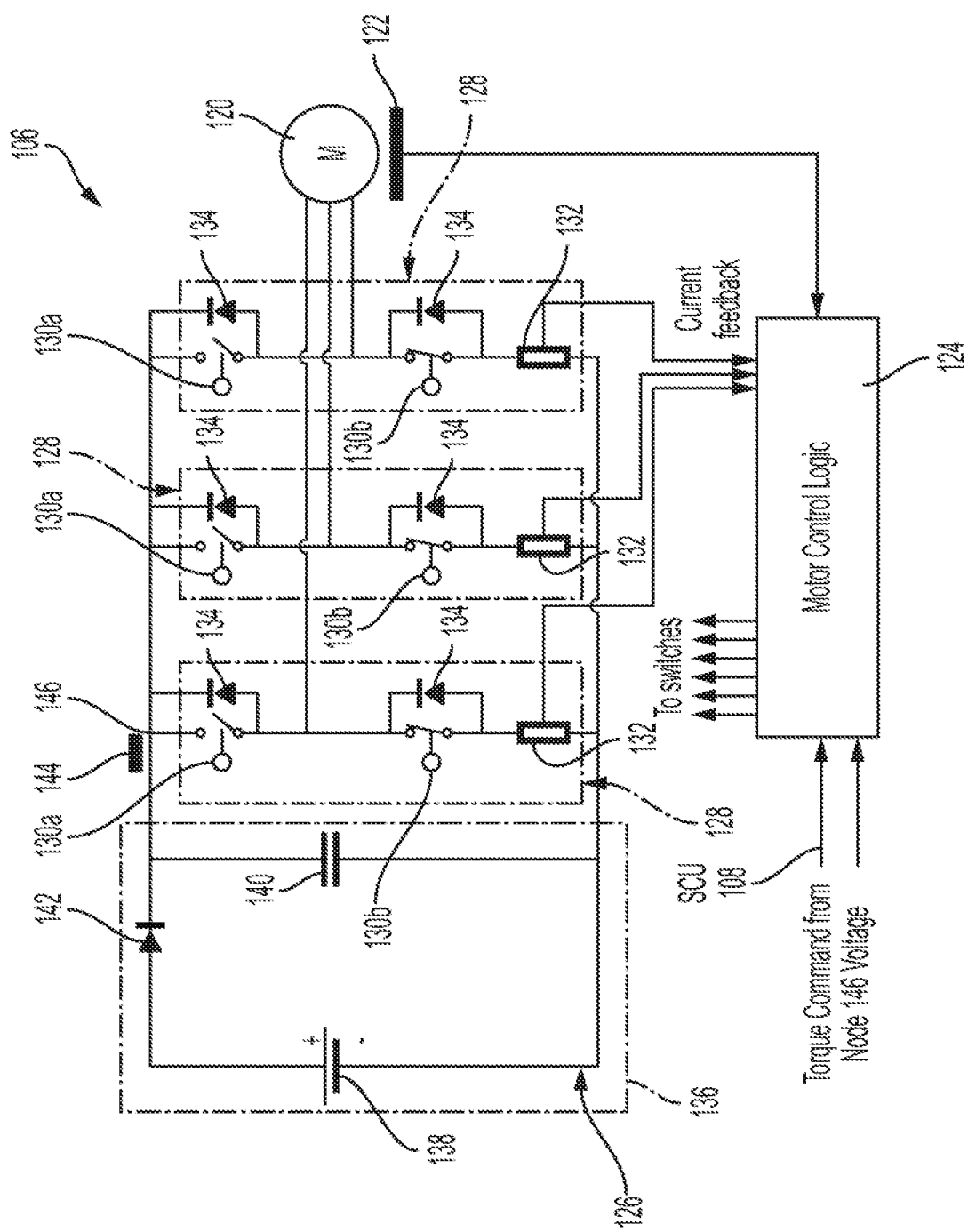
FIG. 3 is a schematic view of a DC motor and associated electronics for a steer by wire system in overcurrent prevention mode in accordance with the subject disclosure.

Referring now to FIG. 3, a schematic view of the haptic feedback mechanism 106 for the steer by wire system 100 is shown in the overcurrent protection mode. When a motor torque feedback drop event occurs, the motor control logic module 124 applies a braking operation algorithm which opens all three high side switches 130a while simultaneously closing all three low side switches 130b to form a circuit. As a result, the undesirably generated current passes through the resistance of the switches 130b and the coils (not explicitly shown) of the motor $120_{[KM1]}$ to dissipate the input power as heat. The braking operation algorithm is applied for a predetermined period of time based on a maximum possible duration of the high speed input condition and/or the time required to dissipate the generated heat so that the feedback motor 120 can maintain normal operation and quickly exit overcurrent protection mode. For example, the maximum possible duration may be the amount of time at the current speed before the actual physical hard stop is reached. In an alternative embodiment, when a motor torque feedback drop event occurs or is about to occur, the motor control logic module 124 opens all three low side switches 130b while simultaneously closing all three high side switches 130a to accomplish the same effect. Namely, the motor control logic module 124 completes a circuit to allow the current to flow through the motor coils, among other places, for dissipation while simultaneously using the undesirable overcurrent in the motor 120 to create a haptic force on the steering wheel 102.

In another embodiment, the total current going into all three switch assemblies 128 is measured with a single sense resistor (not shown) rather than using three sense resistors 132. Thus, the number of current sensors is reduced to one.

Figure 3A:
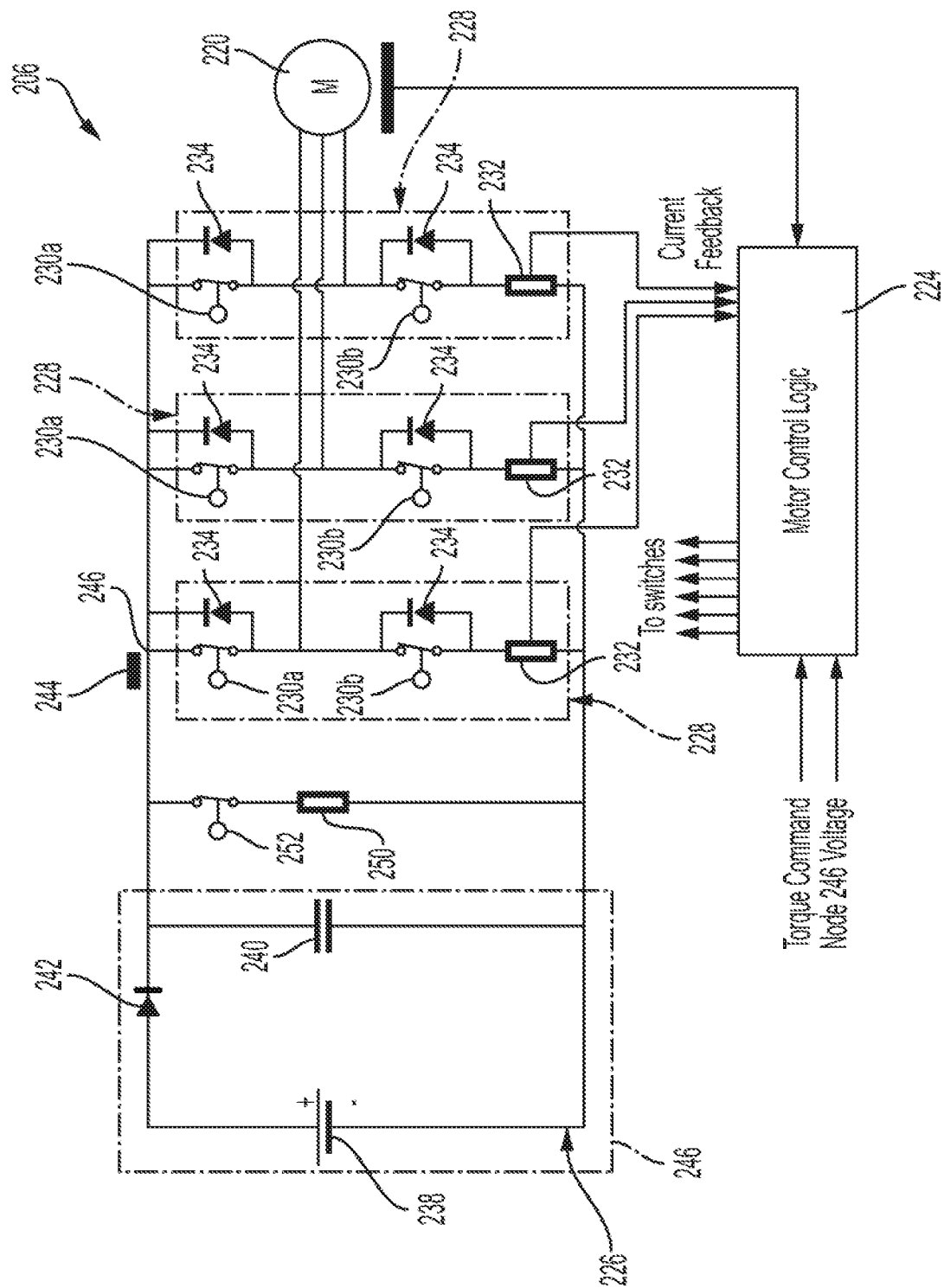
FIG. 3A is a schematic view of another DC motor and associated electronics for a steer by wire system in overcurrent prevention mode in accordance with the subject disclosure.

Referring now to FIG. 3A, a further embodiment of a haptic feedback mechanism 206 for the steer by wire system is shown schematically. Similar elements to those described in connection with above-described embodiments are indicated with the like reference numbers in the 200 series. Many elements are essentially the same as those of the foregoing embodiments and, thus, are not further described herein. The primary difference is the addition of one or more braking resistors to selectively provide further dissipation of input power in overcurrent protection mode. The haptic feedback mechanism 206 includes a resistor 250 connected in parallel with the capacitor 240 and switch assemblies 228. A switch 252 is connected in series with the resistor 250. The motor control logic 224 determines when the switch 252 opens to take the resistor 250 out of the haptic feedback mechanism 206 or closes to put the resistor 250 into the haptic feedback mechanism 206.

When a motor torque feedback drop event occurs, the motor control logic module 224 enters the overcurrent protection mode and applies a braking operation algorithm which opens all three high side switches 230a while simultaneously closing all three low side switches 230b. Additionally, the motor control logic 224 closes switch 252 so that additional input power is dissipated by the resistor 250 as heat in addition to that noted above. As a result, the capacity to dissipate the potentially dangerous overcurrent is increased. Thus, the braking operation algorithm may be applied for an even shorter period of time. During normal operation, the switch 252 is open so that the resistor 250 is effectively not in the circuit.

It is envisioned that the SCU 108 and the haptic feedback mechanism 106 may be integrated or separate with functions distributed in any manner. As such, each of the SCU 108 and mechanism 106 may have a signal processing device. For example, the SCU 108 and motor control logic module 124 each may have a microprocessor, memory as well as the necessary associated components such as wireless communication components. Alternatively or additionally, either may be an application specific integrated circuit (ASIC) in whole or in part. In short, any type of generic or special-purpose, processor-controlled device capable of receiving, processing, storing, and/or transmitting data could be efficiently adapted into the subject technology. A processor generally is logic circuitry that responds to and processes instructions that drive a digital data processing device and can include, without limitation, a central processing unit, an arithmetic logic unit, an ASIC, a task engine, and/or any combinations, arrangements, or multiples thereof. Software or code is present. Software generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s). But, many such functions accomplished by software can also be encoded into circuitry or otherwise hardwired. Those of ordinary skill will recognize that the functions and various processes discussed herein are merely exemplary of the functionality performed by the disclosed technology and thus such processes and/or their equivalents may be implemented in commercial embodiments in various combinations and quantities without materially affecting the operation of the disclosed technology.

The subject technology also includes an endstop mechanism for a steer by wire system. Referring again to FIGS. 1-3, the endstop mechanism includes the haptic feedback mechanism 106 and/or the SCU 108 depending upon how the electronics are configured. In addition to a shaft angle measurement sensor, the sensor assembly 122 also includes a speed sensor (not explicitly shown) to measure shaft speed in addition to positional measurement. The speed sensor is preferably distinct and coupled to the steering wheel or joystick 102 or column 104 for measuring rotational speed of the steering wheel or joystick 102. When the steering wheel or joystick 102 approaches the end of travel within a predetermined range, the haptic feedback mechanism increases the feedback torque to soften and/or prevent an end of travel collision. Further, the haptic feedback mechanism can increase the feedback torque based on the speed at which the user is moving the steering wheel or joystick 102 towards the end of travel. As a result, the user experiences a cushion feel approaching the end of travel for an overall smooth haptic feel without needing a physical cushion to be present.

Figure 4:
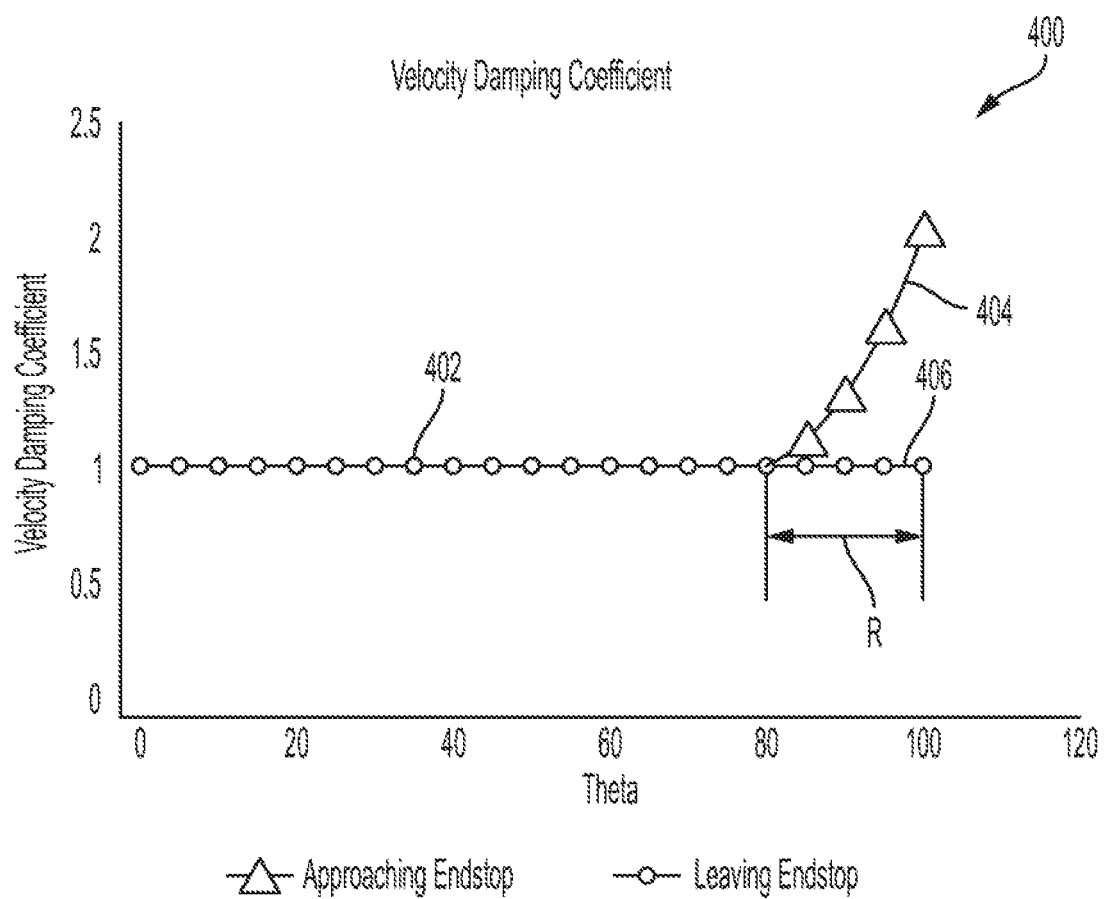
FIG. 4 is a graph of velocity damping coefficient versus position for a steer by wire system with an endstop cushion in accordance with the subject disclosure.

Referring now to FIG. 4, a graph 400 of velocity damping coefficient versus position for a steer by wire system with an endstop cushion in accordance with the subject disclosure is shown. The vertical axis is the velocity damping coefficient and the horizontal axis is the angular position in radians. The haptic feedback mechanism 106 monitors the motor shaft angular position and the rotation speed of the shaft using the sensor assembly 122.

In normal operation, the velocity damping coefficient is one. As a result, multiplying the feedback torque by the velocity damping coefficient has no effect. In FIG. 4, an initial portion 402 of the graph indicates normal operation in a range of about 0-80 radians. As noted above, the haptic feedback mechanism 106 provides feedback torque to the direction of travel of the steering wheel so the user experiences a smooth haptic feel.

When the motor shaft angular position approaches within a predetermined range R of the physical end of travel, the haptic feedback mechanism 106 begins to increase the velocity damping coefficient proportional to the rotational speed as well as inversely proportional to the remaining amount of travel. Thus, as the user approaches the endstop, the haptic force applied to the steering wheel or joystick will increase.

In the example shown in FIG. 4, the predetermined range R is approximately the last 20% of travel and the endstop is at about 100 radians. In the predetermined range R shown as graph section 404, the velocity damping coefficient increases from 1 to about 2. In one embodiment, this results in a doubling of the feedback torque with a more significant increase occurring near the endstop rather than a gradual linear increase. This increase in feedback torque in opposition to the direction of motion will help to slow down the movement and prevent a hard collision for an effective endstop cushion that does not physically limit the travel range or add additional complex components.

When the direction of travel changes to be away from the endstop, the haptic feedback mechanism 106 resets the velocity damping coefficient to one as shown in graph section 406. As a result, the haptic feel of the steer by wire system 100 returns to normal.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, connections, sensors, interfaces, hardware, resistors, switches and the like) described and/or shown as distinct for purposes of illustration may be incorporated within other functional elements in a particular implementation. It is also noted that all of the following claims may be combined and depend from each other in any combination including multiple dependency.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A haptic feedback mechanism for a steer by wire system in a vehicle having a hand-operable controller for guiding movement of the vehicle based on an input motion from a user, the haptic feedback mechanism comprising:
   a DC motor connected to the hand-operable controller and configured to provide a haptic feedback to the user;
   electronic circuitry configured to control operation of the DC motor, wherein the electronic circuitry includes a node;
   a voltage sensor coupled to the node and configured to generate a first signal indicative of a voltage at the node indicative of a current of the DC motor;
   at least one current sense resistor coupled to the DC motor and configured to generate a second signal indicative of a current in the DC motor;
   a sensor assembly operatively coupled to the DC motor and configured to generate a speed signal indicative of a rotational speed of the input motion;
   a motor control logic module operatively connected to: the electronic circuitry; the voltage sensor and configured to receive the first signal; the at least one current sense resistor and configured to receive the second signal; and the sensor assembly and configured to receive the speed signal,
      the motor control logic module being operative to: make a first determination if the voltage at the node is above a predetermined threshold based upon the first signal; make a second determination if the current of the DC motor is above a requested current by the motor control logic based upon the second signal; make a third determination if the rotational speed is too high based upon the speed signal; and change the DC motor into an overcurrent prevention mode based on at least one of the first, second and third determinations, wherein in the overcurrent prevention mode, the motor control logic module uses the electronic circuitry to control the DC motor for a predetermined time period in which electrical power, generated by the input motion, passes through the DC motor to dissipate while maintaining the haptic feedback for the user; and an endstop mechanism including a position sensor configured to detect an angular position of the hand-operable controller, wherein the motor control logic module uses the electronic circuitry to increase the feedback torque within a predetermined range of an end of travel of the DC motor or hand-operable controller.

2. A haptic feedback mechanism for a steer by wire system in a vehicle having a hand-operable controller for guiding movement of the vehicle based on an input motion from a user, the haptic feedback mechanism comprising:

a DC motor connected to the hand-operable controller and configured to provide a haptic feedback to the user, the DC motor having motor coils;

electronic circuitry coupled to the DC motor and configured to control operation of the DC motor;

at least one sensor coupled to the DC motor or electronic circuitry and configured to generate a protection signal indicative of a motor current in the DC motor; and a motor control logic module coupled to: electronic circuitry and configured to control the electronic circuitry; and the at least one sensor, the motor control logic module being operative to change the electronic circuitry into an overcurrent prevention mode based upon the protection signal, wherein in the overcurrent prevention mode, the electronic circuitry passes overcurrent through the motor coils to dissipate the overcurrent while maintaining the haptic feedback for the user.

3. A haptic feedback mechanism for a steer by wire system as recited in claim 2, wherein the at least one sensor is selected from the group consisting of: a voltage sensor coupled to the electronic circuitry and configured to generate a first signal indicative of a current in the DC motor; at least one current sense resistor in the electronic circuitry and configured to generate a second signal indicative of a current in the DC motor; a motion sensor coupled to the DC motor and configured to generate a speed signal indicative of the input motion; and combinations thereof.

4. A haptic feedback mechanism for a steer by wire system as recited in claim 3, the motor control logic module being operative to:

make a first determination if the current in the DC motor is above a predetermined threshold based upon the first signal and/or the second signal;

make a second determination if the input motion of the hand-operable controller is above a predetermined speed based upon the speed signal; and change the electronic circuitry into the overcurrent prevention mode based upon the first and second determinations.

5. A haptic feedback mechanism for a steer by wire system as recited in claim 2, further comprising at least one braking resistor and at least one braking resistor switch in the electronic circuitry and configured to selectively connect the at least one braking resistor to provide supplemental resistance to further dissipate power in the overcurrent prevention mode.

6. A haptic feedback mechanism for a steer by wire system as recited in claim 2, wherein the overcurrent prevention mode is for a predetermined time period based on a maximum possible duration of a high speed input condition.

7. A haptic feedback mechanism for a steer by wire system as recited in claim 2, wherein the electrical power is dissipated as heat and the overcurrent prevention mode is for a predetermined time period based a time required to dissipate the heat.

8. A haptic feedback mechanism for a steer by wire system as recited in claim 2, wherein the electronic circuitry includes three pairs of switches in parallel, each pair having a high side switch and a low side switch so that in the overcurrent prevention mode, the high side switches are open and the low side switches are closed periodically to maintain the haptic feedback to the user.

9. A haptic feedback mechanism for a steer by wire system as recited in claim 8, further comprising a DC power supply circuit, wherein the three pairs of switches are configured in half bridges between the DC motor and the DC power supply circuit.

10. An endstop mechanism for a steer by wire system for a vehicle having a hand-operable controller for guiding movement of the vehicle, the endstop mechanism comprising:

a haptic feedback mechanism having a motor coupled to the hand-operable controller for providing feedback torque on the hand-operable controller;

a position sensor coupled to the haptic feedback mechanism for detecting an angular position of the motor or hand-operable controller; and a speed sensor coupled to the haptic feedback mechanism for detecting a speed of the hand-operable controller, wherein the haptic feedback mechanism increases the feedback torque within a predetermined range of an end of travel of the motor or hand-operable controller, wherein the feedback torque is adjusted by modifying a velocity damping coefficient proportional to the speed within the predetermined range and a proximity to the end of travel, and wherein when a direction of travel changes to be away from the end of travel, the haptic feedback mechanism resets the velocity damping coefficient to one for returning to normal operation within the predetermined range.

11. An endstop mechanism for a steer by wire system as recited in claim 10, wherein the feedback torque is adjusted by modifying the damping coefficient inversely proportional to the proximity to the end of travel.

12. An endstop mechanism for a steer by wire system as recited in claim 11, wherein the damping coefficient has a nominal value of 1 outside the predetermined range and when a direction of travel is away from the end of travel.

13. An endstop mechanism for a steer by wire system as recited in claim 10, wherein the hand-operable controller is a steering wheel.

14. An endstop mechanism for a steer by wire system for a vehicle having a hand-operable controller for guiding movement of the vehicle, the endstop mechanism comprising:

a haptic feedback mechanism having a motor coupled to the hand-operable controller for providing feedback torque on the hand-operable controller; and a position sensor coupled to the haptic feedback mechanism for detecting an angular position of the motor or hand-operable controller, wherein the haptic feedback mechanism increases the feedback torque within a predetermined range of an end of travel of the motor or hand-operable controller, wherein the feedback torque is adjusted by modifying a damping coefficient proportional to a speed and inversely proportional to a proximity to the end of travel, and wherein the damping coefficient has a nominal value of 1 outside the predetermined range and when a direction of travel is away from the end of travel.

15. An endstop mechanism for a steer by wire system as recited in claim 14, further comprising a speed sensor coupled to the haptic feedback mechanism for detecting a speed of the hand-operable controller, wherein the feedback torque is adjusted by modifying a velocity damping coefficient proportional to the speed within the predetermined range and a proximity to the end of travel.

16. An endstop mechanism for a steer by wire system as recited in claim 15, wherein when a direction of travel changes to be away from the end of travel, the haptic feedback mechanism resets the velocity damping coefficient to one for returning to normal operation within the predetermined range.

17. An endstop mechanism for a steer by wire system as recited in claim 14, wherein the hand-operable controller is a steering wheel.

\* \* \* \* \*